United States Patent
Hagström et al.

(10) Patent No.: US 6,712,606 B2
(45) Date of Patent: Mar. 30, 2004

(54) COMBUSTION OPTIMIZATION

(75) Inventors: Ulf Hagström, Nyköping (SE); Eric Norelius, Enskede (SE)

(73) Assignee: Ecomb AB, Sodertalje (SE)

( * ) Notice: Subject to any disclaimer, the term of this patent is extended or adjusted under 35 U.S.C. 154(b) by 0 days.

(21) Appl. No.: 10/294,940

(22) Filed: Nov. 15, 2002

(65) Prior Publication Data

US 2003/0124477 A1 Jul. 3, 2003

(30) Foreign Application Priority Data

Nov. 16, 2001 (SE) .............................. 0103822

(51) Int. Cl.⁷ ................................. F23J 17/00
(52) U.S. Cl. .............................. 432/72; 432/2; 110/345
(58) Field of Search ................................ 432/2, 26, 49, 432/38, 72, 198; 110/347, 345, 342, 297, 308, 215, 348

(56) References Cited

U.S. PATENT DOCUMENTS

| | | | |
|---|---|---|---|
| 4,403,941 A | * | 9/1983 | Okiura et al. ............... 431/10 |
| 5,252,298 A | | 10/1993 | Jones |
| 5,269,235 A | * | 12/1993 | McGill et al. ............. 110/246 |
| 5,286,458 A | | 2/1994 | Yang et al. |
| 5,741,130 A | * | 4/1998 | Hagstrom et al. ............ 432/2 |
| 5,908,003 A | * | 6/1999 | Hura et al. ................ 110/345 |
| 5,918,555 A | * | 7/1999 | Winegar .................... 110/345 |
| 6,190,628 B1 | * | 2/2001 | Carter ..................... 423/235 |

FOREIGN PATENT DOCUMENTS

| | | |
|---|---|---|
| DE | 3907330 | 9/1990 |
| SE | 9201747-4 | 9/1995 |
| SE | 9304038-4 | 9/1995 |
| SE | 9802570-3 | 3/2000 |
| SE | 0000103-2 | 9/2001 |
| WO | WO 95/15463 | 6/1995 |

\* cited by examiner

Primary Examiner—Gregory Wilson
(74) Attorney, Agent, or Firm—Sughrue Mion, PLLC

(57) ABSTRACT

The present invention relates to a method and a device for reducing emission from a combustion or gasification plant, said plant having an combustion chamber housing means for insertion of a first fluid into said chamber, introduction of said fluid into said chamber being effective to reduce the emission of at least one substance from said combustion and said fluid having an optimal operating temperature range for which emissions are particularly low. The temperature is established in a volume in said combustion chamber, where said volume includes the position for insertion of said first fluid. A second fluid is inserted into said combustion chamber and is effective to reduce the temperature in said volume in said combustion chamber, if said temperature is established to be higher than said optimal temperature range. A third fluid is inserted into said combustion chamber and is effective to increase the temperature in said volume in said combustion chamber, if said temperature is established to be lower than said optimal temperature range.

34 Claims, 4 Drawing Sheets

COMBUSTION OPTIMIZATION

TECHNICAL FIELD

The present invention relates to a method and a device for supplying at least a first fluid to a combustion chamber in a heat-generating plant, e.g. a heating boiler or a kiln. More specifically, the present invention relates to a method and a device for controlling the emissions from such a combustion chamber.

BACKGROUND OF THE INVENTION

Today a significant part of the energy generated in the modern society comes from burning of fuel. This includes wood fuels, straw, waste such as industrial, municipal, hazardous and hospital waste and also hard coal, lignite, peat, lime sludge and black liquor. These fuels are burnt in heat-generating plants in combustion chambers and results in unavoidable emission of more or less hazardous substances.

To reduce the amount of emission different devices has been contemplated and successfully implemented in existing plants, as well as in new. In this respect reference is made to SE9201747-4, SE9304038-4, SE9802570-3 and SE0000103-2 all in the name of ECOMB AB and included herein by reference.

According to the references above reduction of emissions can be achieved by introducing secondary air into the combustion chamber in a heat-generating plant.

Another way to achieve reduction of emission is to introduce substances, such as $NH_3$, to reduce specific emissions, such as NO and $NO_2$, commonly denoted $NO_x$. The ammonia reacts with the NO and the $NO_2$ to form substances which is not harmful to the environment.

One problem with introducing another harmful substance, such as ammonia, is that slip can occur, i.e. ammonia is emitted to the environment.

Another problem is that the reaction between ammonia and $NO_x$ may not always be optimal resulting in increased cost, when excessive amounts of ammonia is used to reduce the emission of $NO_x$, but with limited success.

Yet another problem, realized by the inventor, is that the temperature of the combustion chamber, where $NH_3$ is introduced, is not optimal for reaction with $NO_x$.

SUMMARY OF THE INVENTION

It is a main object of the present invention to provide an apparatus and method for controlling the temperature in a combustion chamber to be within a preferred range, within which range a first fluid is particular active to reduce the emission of at least a first substance.

It is in this respect a particular object of the invention to provide such apparatus and method for reducing the emission of NO and $NO_2$.

It is still a further object of the invention to provide such apparatus and method for effective use of supplied ammonia for reduction of emission of NO and $NO_2$ so that no or minimal slip of ammonia emission occur.

These objects among others are, according to a first aspect of the present invention, attained by providing a method for reducing the emissions from a combustion or gasification plant having a combustion chamber. The combustion chamber is housing means for insertion of a first fluid into said chamber, where the introduction of said fluid into said chamber is effective to reduce the emission of at least one substance. Said fluid having an optimal operating temperature range for which said fluid is particular active and thus emission is particular low. The method comprises the steps of establishing the temperature in a volume where said fluid is introduced into said combustion chamber. If the temperature is higher than said optimal operating range a second fluid is introduced into said chamber, where said second fluid is effective to reduce the temperature in said volume. If the temperature, on the other hand, is lower than said optimal operating temperature range a third fluid is introduced into said combustion chamber. Said third fluid is effective to increase the temperature of said volume.

In more detail, the method according to a preferred embodiment of the present invention comprises an axially displaceable tube, which can be introduced and withdrawn from said combustion. Chamber said tube is used for introducing a fourth fluid, e.g. air or re-circulated flue gas, into said chamber. The fourth fluid is inserted under pressure to create swirls or turbulence in the flue gas flow to change the flow pattern and improve mixing in the combustion chamber. Through said tube said first and second or third fluid is introduced into said chamber. Alternatively, is it also possible to use said tube for insertion of only one or two of the three fluids, and using a separate means for introduction of the remaining fluids.

A thermocouple is arranged on said tube for measuring the surrounding temperature where said first fluid is introduced into said chamber. Alternatively, said thermocouple may also be arranged on the wall of the combustion chamber. Thus it is possible to continuously measure the temperature and dynamically control the introduction of said fluids into the combustion chamber to regulate the temperature.

According to another preferred embodiment 25% ammonia aqua is mixed with water and injected into the combustion chamber through said tube. The water in the mix serves to reduce the temperature in the chamber.

The amount of water injected into the chamber is controlled to reach said optimal operating temperature range. The proportions between the ammonia aqua and the water is also controlled, in dependence of the amount of water injected, so that an optimal amount of ammonia is introduced into the chamber so as to reach a maximum reduction of the emission of NO and $NO_2$ and also to minimize the ammonia slip. The amount of water and ammonia to be introduced into the combustion chamber varies with, for instance, the size of the combustion chamber and the temperature.

These objects among others are, according to a second aspect of the present invention, attained by providing a device for reducing the emission from a combustion or gasification plant having a combustion chamber. A supplier is arranged in said chamber for supplying at least a first fluid. The fluid is effective to reduce the emission of at least one substance and has an optimal operating temperature range. The device also comprises means for controlling the temperature in at least a volume of said chamber to be in said optimal temperature range.

According to a first preferred embodiment of the second aspect of the invention, said device comprises an axially displaceable tube for displaceable insertion into said chamber. The tube is sealed in a first end and comprises orifices along its length. The first end is inserted into said chamber. Compressed air is supplied in the second end of said tube and forced to exit the tube through said orifices creating swirls in the flue gas in the combustion chamber, water is fed through a hose to the tube and thus made to eject, by the compressed air, through the orifices and into the combustion chamber. Ammonia aqua is mixed into said water in proportions suitable to achieve minimal or at least reduced emission of NO and $NO_2$. The device further comprises a thermocouple, preferably arranged on said tube, coupled to control means. Said control means is arranged to increase the amount of water ejected into the chamber if the temperature is above the optimal operating range and also to control the proportion of ammonia aqua mixed into the water so that an optimal amount of ammonia is introduced into the combustion chamber.

The device further comprises means for injecting a third fluid into said combustion chamber. The third fluid is effective to raise the temperature if the temperature is below the optimal operating temperature range. Suitably the third fluid is inserted into the chamber through the tube, but separate means is also possible to use. The third fluid can be hydrocarbon fuel in gaseous, liquid or fixed form such as natural gas, oil or pulverized wood, which will increase the combustion if introduced into a combustion chamber.

Preferably, the water is drawn from the mains, or is wastewater or is water that has been used for cooling the tubes.

If the object is to reduce the emission of NO and $NO_2$, a suitable operating temperature range is 800°–1200° C., preferably 830°–1000° C. and particularly 850°–950° C.

Further characteristics of the invention and advantages thereof will be evident from the following detailed description of embodiments of the invention.

BRIEF DESCRIPTION OF THE DRAWINGS

The present invention will become more fully understood from the detailed description of embodiments of the present invention given herein below and the accompanying FIGS. 1–6, which are given by way of illustration only, and thus are not limitative of the present invention.

PREFERRED EMBODIMENTS

In the following description, for purposes of explanation and not limitation, specific details are set forth, such as particular techniques and applications in order to provide a thorough understanding of the present invention. However, it will be apparent to one skilled in the art that the present invention may be practiced in other embodiments that depart from these specific details. In other instances, detailed descriptions of well-known methods and apparatuses are omitted so as not to obscure the description of the present invention with unnecessary details.

Figure 1:
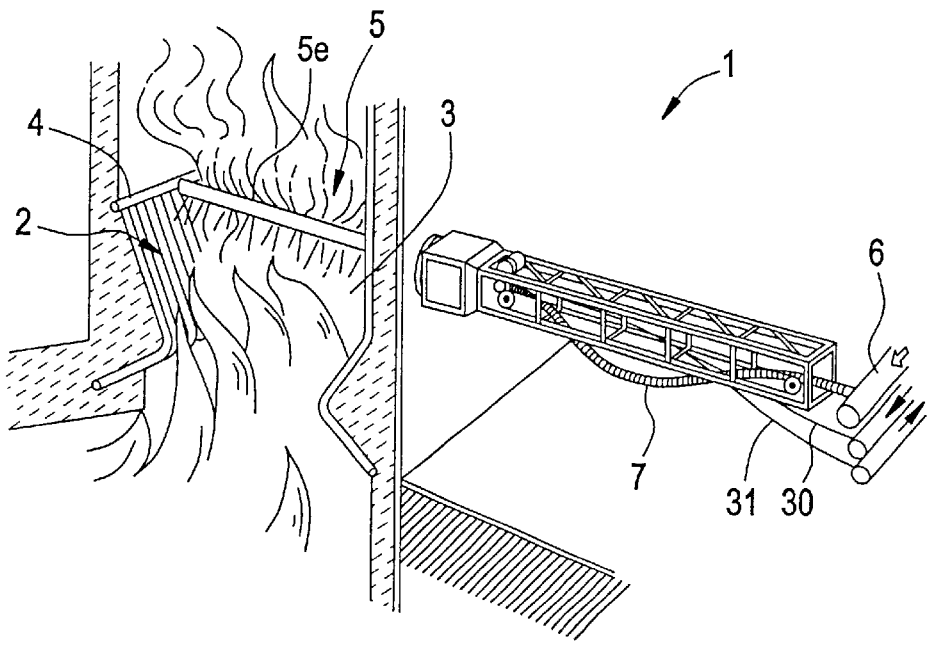
FIG. 1 is a perspective view, which shows a combustion chamber in cross-section with a tube according to a preferred embodiment of the invention.

With reference to FIG. 1, a combustion plant 2 comprises a combustion chamber 3 for combustion of fixed fuels having a lower grating (not shown). The fuel may be supplied intermittent or continuously and primary combustion air is blown in from beneath through the lower grating to the combustion chamber 3. Secondary air is supplied through supply devices, one of which is shown and denoted 1. The supply device has a tube 5, which is axially displaceable and enters the combustion chamber 3 through an opening in the wall of the combustion plant 2.

Some of the particles will deposit on the inside walls, having water or steam tubing 4, as well as on the tube 5 itself. These particles may clog the orifices 5e used for inject fluids or gas and for that matter the supply device 1 is provided with cleaning means for removing flue dust from the tube 5.

Compressed air or re-circulated flue gas is supplied to the tube 5 from a fan (not shown) via tubing 6 and flexible hose 7. The hose 7 comprises a quick coupling device that is connectable to a corresponding coupling device on the tube 5.

Figure 2:
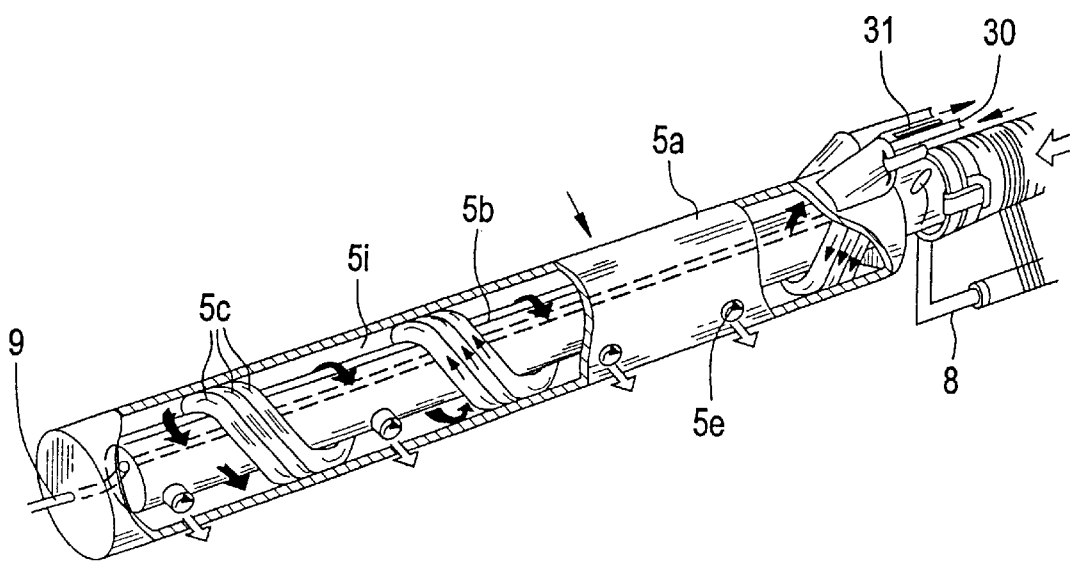
FIG. 2 is a perspective view of the tube with parts of the tube removed.

With reference to FIG. 2, the tube in FIG. 1 is disclosed in more detail. The tube comprises a first outer jacket 5a and an inner tube 5b. Openings or orifices 5e are distributed over the tube 5 for ejecting gas or fluids. Gas or fluids are ejected through said orifices under pressure to disturb the flue gas to create swirls or turbulence in the flue gas stream in the combustion chamber. Three cooling tubes are helically arranged around the inner tube 5b and fed with water through flexible hose 30. A further flexible hose 31 removes the used cooling water. Both the outer jacket 5a and the inner tube 5b have a closed inner end. A further hose 8 is arranged to supply ammonia aqua to the tube for ejection into the combustion chamber 3. Since the ejection of gas or fluids through the orifices 5e creates swirls in the flue gas column in the combustion chamber, the ammonia injected into the combustion chamber is effectively mixed with the flue gas and will thus have an increased reactivity. The ammonia reacts with NO and $NO_2$, commonly denoted $NO_x$, and reduces the emission of these substances. It should be noted that even though ammonia aqua is used in this preferred embodiment ammonia in gas form may equally well be used, or even preferred.

Figure 3:
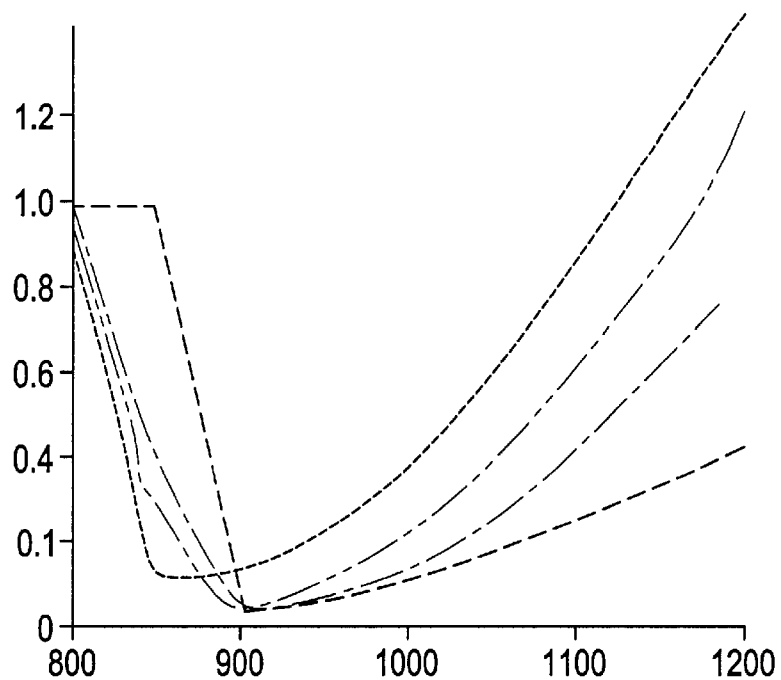
FIG. 3 shows a graph of $NO_x$-out/$NO_x$-in plotted against temperature for several levels of inlet $O_2$ concentrations.

FIG. 3 shows a graph over $NO_x$-out/$NO_x$-in plotted against temperature for several inlet oxygen concentrations. The dashed line corresponds to 0.5% $O_2$, the dash-dot line corresponds to 2% $O_2$, the dash-dot-dot line corresponds to 5% and the dotted line to 10% $O_2$. The temperature is given in degrees Celsius and as can easily be seen from the graph, the emission is at a minima around 850° to 1100° C., somewhat depending on the inlet oxygen concentration. Particularly, the emission is very low around 850° to 950° C. for all oxygen concentrations.

Figure 4:
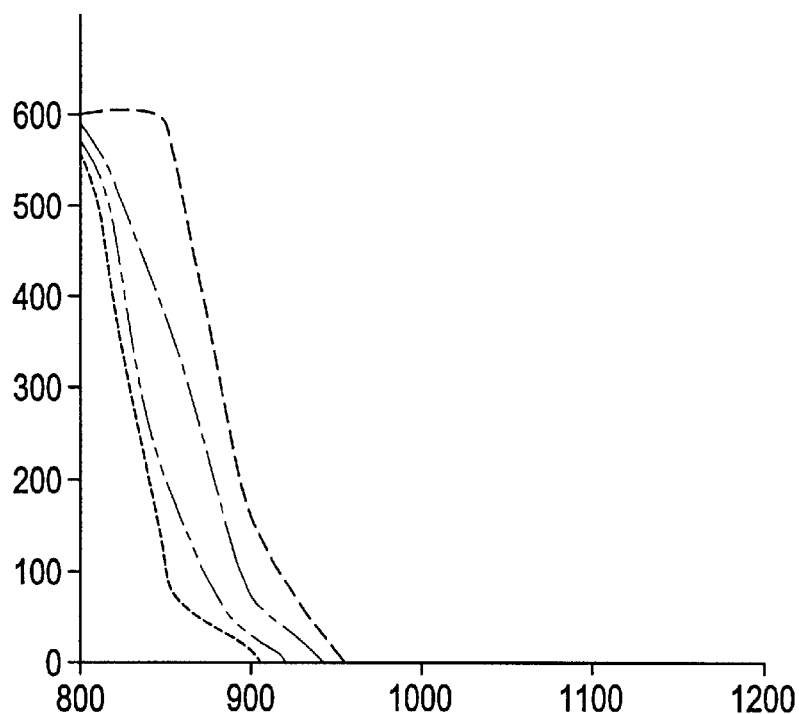
FIG. 4 shows a graph of ammonia slip emission plotted against temperature for several levels of inlet $O_2$ concentrations.

FIG. 4 is a graph over emission of $NH_3$ and thus represents the slip of ammonia injected into the combustion chamber plotted against the temperature (in degrees Celsius) for several inlet oxygen concentrations. The level of $NH_3$ is given in ppm (parts per million). The dashed line corresponds to 0.5% $O_2$, the dash-dot line corresponds to 2% $O_2$, the dash-dot-dot line corresponds to 5% and the dotted line to 10% $O_2$. As can be seen from the graph the emission of $NH_3$ drops sharply from 850° C. and is practically insignificant for temperatures above 950° C.

It is clear from FIGS. 3 and 4 that an optimal operating temperature range for introduction of ammonia into the combustion chamber is between 830° to 1100° degrees Celsius, and particularly between 850° and 950° C. It is, however, common that the temperature in the combustion chamber 3 is above this range.

In this respect the tube 5, FIG. 2, has a thermocouple 9 arranged to measure the temperature in the immediate surroundings of the tube 5. If the temperature is too high, re-circulated flue gas is mixed into the secondary compressed air ejected through the orifices 5e into the combustion chamber 3. The effect of mixing air with flue gas is to reduce the amount of oxygen in the injected air thereby achieving a less violent combustion and thus a lower temperature. If, on the other hand, the temperature is to low, fuels may be added to increase the temperature. In this respect hydrocarbon fuels in a variety of forms may be used, that is, gaseous fuels, e.g. natural gas, fluid fuels, e.g. oil and fixed fuels, e.g. pulverized wood.

Figure 5:
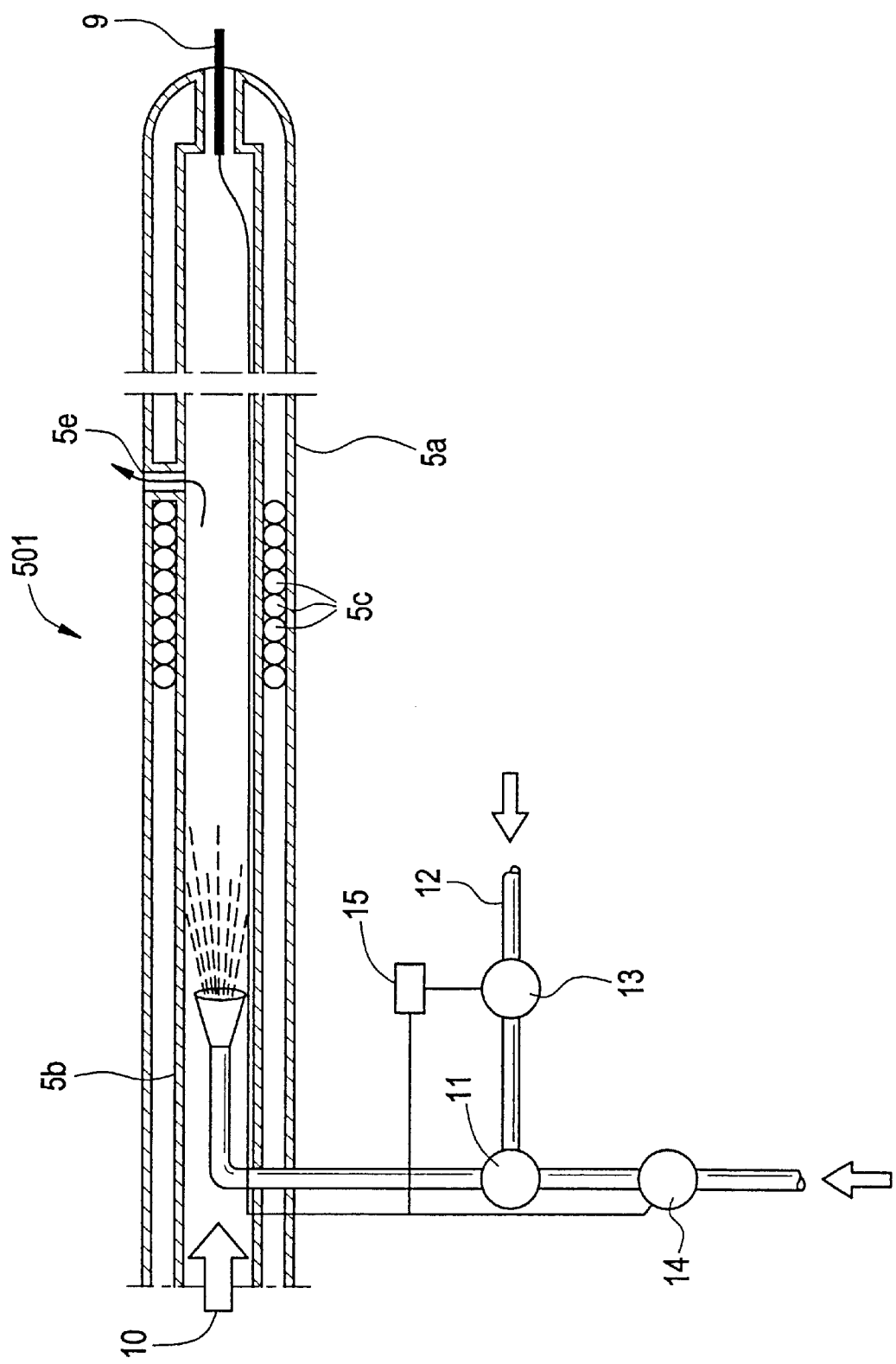
FIG. 5 shows a cross-section of the tube according to a preferred embodiment of the invention.

With reference to FIG. 5, a tube 501 is disclosed in cross-section, according to a second preferred embodiment of the invention. Like details are denoted with same numerals. Compressed air 10 is fed to the inner tube and is forced to exit through openings or orifices 5e. A hose 8 for supplying aqua ammonia to the tube 5 is coupled to a three-way valve 11. With the ejection of the compressed air into the combustion chamber swirls or turbulence is created in the flue gas stream in the combustion chamber. Thus an increased efficiency with regards to mixing the ammonia into the flue gas is achieved, thus increasing the reactivity of the ammonia with the flue gas resulting in even lower emissions of $NO_x$. To the three-way valve 11 is also fed 25% ammonia aqua through a hose 12. A first check valve 13 is arranged to regulate the amount of ammonia aqua supplied to the three-way valve 11 and a second check valve 14 controls the amount of water supplied. A thermocouple 9 is coupled to a processor 15, which in turn is coupled to the first and second check valves. The processor is arranged to control the amount of water supplied into the tube 5 through the hose 8 and also to control the amount of ammonia aqua in the water, by adjusting the first and second check valves 13, 14, respectively.

For example, if the processor records that the temperature is 1000° C. and the upper limit value for the optimal operating temperature range is 950°, the processor may determine that for example 10 kg water per minute shall be introduced into the combustion chamber 3 to reduce the temperature. The amount of ammonia to be injected into the combustion chamber may be set to for example 0.25 kg per minute. This equals 1 Kg per minute of 25% ammonia aqua. The processor thus set the first check valve 13 to let through 1 Kg of 25% ammonia aqua per minute and set the second check valve to let through approximately 9 Kg water per minute. When the temperature drops, the proportions is of course changed until equilibrium is achieved. If the temperature is too low a hydrocarbon fuel such as natural gas is injected.

Figure 6:
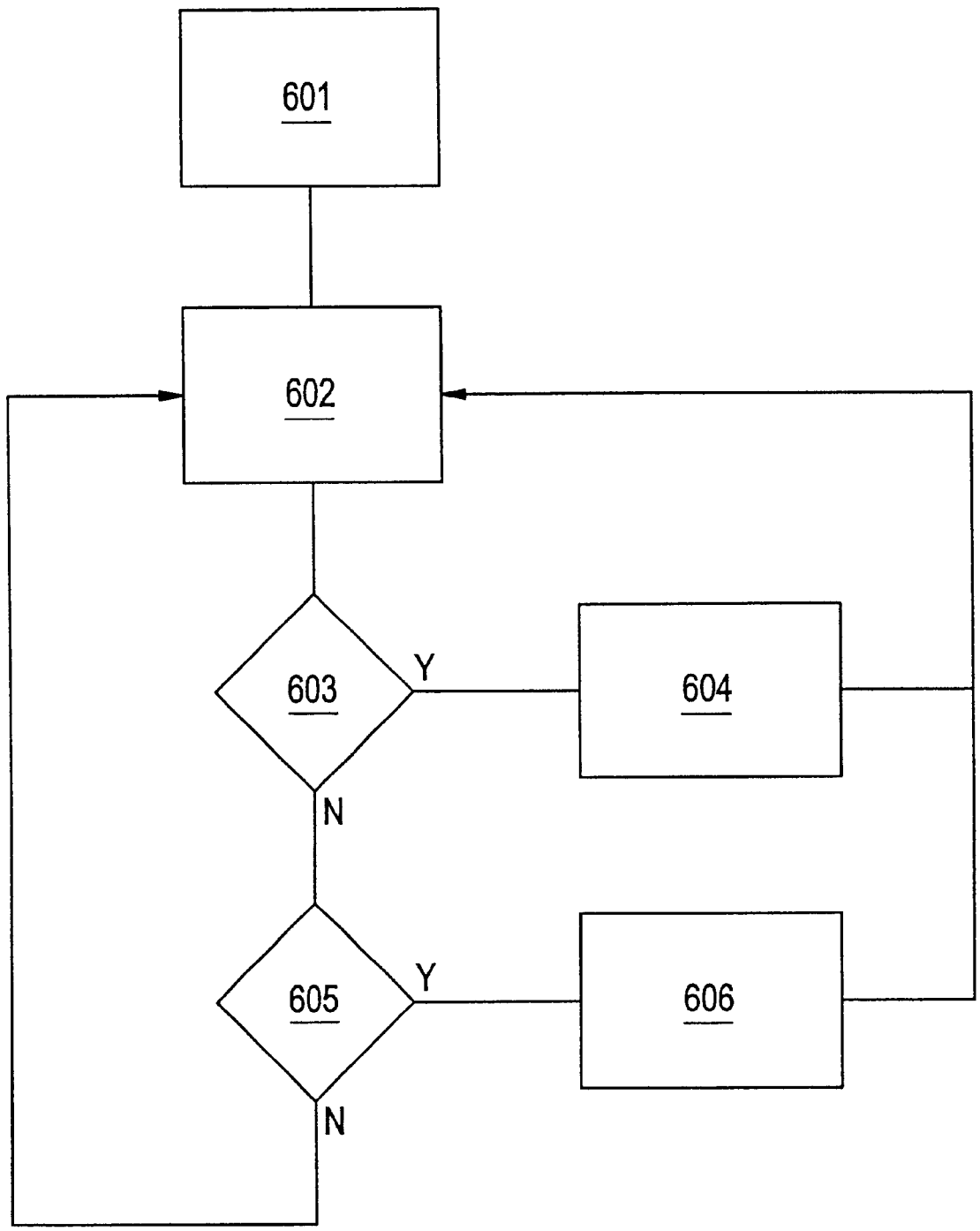
FIG. 6 shows a flow diagram for the method of controlling the temperature according to the invention.

FIG. 6 shows a flow chart according to a preferred embodiment of the invention. Initially, in box 601, fixed parameters are set, such as optimal operating temperature range, amount of ammonia to introduce into the combustion chamber 3 etc. The temperature is established 602. Then the process enters box 603 where it is established if the temperature is above the optimal operating temperature range. If so the amount of water injected into the combustion chamber 3 is increased 604. If not the process continues to box 605 where it is established if the temperature is below the optimal operating temperature range. It so natural gas is introduced into the combustion chamber 3. New reading of the temperature is then performed 602.

It will be obvious that the invention may be varied in a plurality of ways. The natural gas or the water may be introduced into the combustion chamber through its own tubing. The thermocouple may be arranged on the combustion chamber wall. A plant may have only means to increase the temperature in the combustion chamber 3, or alternatively only means to lower the temperature.

Even though only emissions of $NO_x$ has been discussed in the foregoing, other types of emissions can be lowered using the same methods and devices, however with use of other fluids. For instance, injecting limestone or bicarbonate into the combustion chamber may reduce emissions of $SO_x$, hydrochloric acid, heavy metals and dioxin. These processes will also have optimal operating temperature ranges and would thus be well suited to use with the inventive devices and methods. It is thus clear that the present invention is not limited to reducing emission of a particular substance, but indeed would be suitable for optimizing several different emissions characteristics.

Such variations are not to be regarded as a departure from the scope of the invention. All such modifications as would be obvious to one skilled in the art are intended to be included within the scope of the appended claims.

What is claimed is:

1. A method for reducing emissions from a combustion or gasification plant, said plant having a combustion chamber housing means for insertion of a first fluid into said chamber, introduction of said first fluid into said chamber being effective to reduce the emission of at least one substance from said combustion and said first fluid having an optimal operating temperature range for which emissions are particularly low, characterised in that said method comprises the steps of, establishing the temperature in a volume in said combustion chamber, where said volume includes the position for insertion of said first fluid, inserting into said combustion chamber a second fluid effective to reduce the temperature in said volume in said combustion chamber, if said temperature is established to be higher than said optimal temperature range, and inserting into said combustion chamber a third fluid effective to increase the temperature in said volume in said combustion chamber, if said temperature is established to be lower than said optimal temperature range.

2. The method according to claim 1, wherein said combustion chamber houses at least one axially displaceable tube, through which at least one of said first and, second or third, fluid is inserted into said chamber.

3. The method according to claim 2, wherein a fourth fluid is inserted under pressure through said axially displaceable tube into said combustions chamber so as to disturb the flow of flue gas in said combustion chamber to create swirls, change the flow pattern and improve the mixing in said combustion chamber.

4. The method according to claim 3, wherein said fourth fluid is air or re-circulated flue gas.

5. The method according to claim 2, wherein said second fluid is introduced under pressure through said axially displaceable tube so as to disturb the flow of flue gas in said combustion chamber to create swirls, change the flow pattern and improve the mixing in said combustion chamber.

6. The method according to claim 2, wherein said at least one axially displaceable tube is equipped with a thermocouple for establishing the temperature in a volume in said combustion chamber.

7. The method according to claim 1, wherein said temperature is continuously established and the amount of said second and/or third fluid is continuously controlled to achieve said optimal temperature range.

8. The method according to claim 1, wherein said first fluid is selected from a group of fluids including $NO_x$ reducing agents, such as ammonia aqua, ammonia gas, urea and $SO_x$ or HCl reducing agents, such as lime stone and bicarbonate.

9. The method according to claim 1, wherein said first fluid is ammonia aqua or ammonia gas, said second fluid is water and said third fluid is selected from a group of fuels of hydrocarbons including gaseous fuels, e.g. natural gas, liquid fuels, e.g. oil and solid fuels, e.g. pulverized wood.

10. The method according to claim 9, wherein
said ammonia aqua and said water is mixed, and
the proportion of $NH_3$ in the water is controlled supply an optimal volume part of $NH_3$ to reduce the emissions of $NO_x$ to a maximum extent, and an optimal volume part of water to reduce the temperature in the combustion chamber to the optimal temperature range.

11. A device for reducing the emission of at least one substance from a combustion or gasification plant by means of supplying a first fluid for optimising flue gas or gas parameters, said first fluid being effective to reduce the emission of said at least one substance and having a optimal operating temperature range,
said plant comprising a combustion or gasification chamber having a supplier for supplying at least said first fluid to said chamber, characterised in,
means for controlling the temperature in said combustion chamber, in at least a volume comprising the position of insertion of said first fluid into said chamber, to be in said optimal operating temperature range
wherein the device further comprises means for inserting a second fluid into said combustion chamber to lower the temperature in said volume if the temperature is above said optimal operating temperature range.

12. The device according to claim 11, wherein said device comprises a thermocouple for measuring the temperature in at least said volume.

13. The device according to claim 11, wherein said supplier is at least a first axially displaceable tube for displaceable insertion into said combustion chamber.

14. The device according to claim 13, wherein a said device comprises means for ejecting a fourth fluid into said combustion chamber through said tube under pressure so as to disturb the flow of the flue gas in the combustion chamber to create swirls, change the flow pattern and improve the mixing in said combustion chamber.

15. The device according to claim 14, wherein said fourth fluid is air or re-circulated flue gas.

16. The device according to claim 11, wherein said second fluid is introduced under pressure into said combustion chamber so as to disturb the flow of flue gas in the combustion chamber to create swirls, change the flow pattern and improve the mixing in said combustion chamber.

17. The device according to claim 11, wherein said first fluid is selected from a group of fluids including $NO_x$ reducing agents or HCl reducing agents.

18. The device according to claim 17, wherein said first fluid is ammonia aqua or ammonia gas and said tube comprises means for supplying compressed air into a cavity of said tube, means for supplying water into said cavity and that said tube comprises orifices through which said water and compressed air ejects into said combustion chamber to lower the temperature in said volume if said temperature is above said optimal operating temperature range and to disturb the flow of the flue gas in said combustion chamber to create swirls, change the flow pattern and improve the mixing in said combustion chamber.

19. The device according to claim 18, wherein a thermocouple is arranged on said tube, said water supplying means comprises a first controller for controlling the amount of water supplied to said chamber, a mixer for mixing ammonia aqua into said water, a second controller for controlling the amount of ammonia aqua mixed into said water, and wherein said thermocouple is coupled to said first and second controller for controlling the amount of water and $NH_3$ supplied to the combustion chamber.

20. The device according to claim 19, wherein said first and second controller is throttle valves, said mixer is a three-way valve, and wherein said thermocouple is coupled to a computer arranged to control said valves.

21. The device according to claim 18, wherein said water is supplied from a group of sources including: the water mains, the drain or cooling water from the cooling of said tube.

22. The device according to claim 11, wherein said second fluid is flue gas.

23. The device according to claim 11, wherein said device further comprises means for ejecting a third fluid into said combustion chamber, said fluid being effective to raise the temperature in said volume in said combustion chamber if said temperature is below said optimal operating range.

24. The device according to claim 23, wherein said third fluid is ejected through said supplier, and said third fluid is selected from a group of fuels of hydrocarbons including gaseous fuels, liquid fuels, and solid fuels.

25. The device according to claim 11, wherein said second fluid is ejected into said combustion chamber if the temperature measured by said thermocouple is above said optimal operating temperature range and wherein said third fluid is ejected into said combustion chamber if the temperature measured by said thermocouple is below said optimal operating temperature range.

26. A device for reducing the emission of at least one substance from a combustion or gasification plant by means of supplying a first fluid for optimising flue gas or gas parameters, said first fluid being effective to reduce the emission of said at least one substance and having a optimal operating temperature range, said plant comprising a combustion or gasification chamber having a supplier for supplying at least said first fluid to said chamber, comprising:
means for controlling the temperature in said combustion chamber, in at least a volume comprising the position of insertion of said first fluid into said chamber, to be in said optimal operating temperature range, wherein:
said first fluid is selected from a group of fluids including $NO_x$ reducing agents or HCl reducing agents; and
said first fluid is ammonia aqua or ammonia gas and said tube comprises means for supplying compressed air into a cavity of said tube, means for supplying water into said cavity and that said tube comprises orifices through which said water and compressed air ejects into said combustion chamber to lower the temperature in said volume if said temperature is above said optimal operating temperature range and to disturb the flow of the flue gas in said combustion chamber to create swirls, change the flow pattern and improve the mixing in said combustion chamber.

27. The device according to claim 26, wherein a thermocouple is arranged on said tube, said water supplying means comprises a first controller for controlling the amount of water supplied to said chamber, a mixer for mixing ammonia aqua into said water, a second controller for controlling the amount of ammonia aqua mixed into said water, and wherein said thermocouple is coupled to said first and second controller for controlling the amount of water and NH$_3$ supplied to the combustion chamber.

28. The device according to claim 27, wherein said first and second controller comprise throttle valves, said mixer comprises a three-way valve, and wherein said thermocouple is coupled to a computer arranged to control said valves.

29. The device according to claim 26, wherein said water is supplied from a group of sources including: the water mains, the drain or cooling water from the cooling of said tube.

30. A device for reducing the emission of at least one substance from a combustion or gasification plant by means of supplying a first fluid for optimising flue gas or gas parameters, said first fluid being effective to reduce the emission of said at least one substance and having a optimal operating temperature range, said plant comprising a combustion or gasification chamber having a supplier for supplying at least said first fluid to said chamber, comprising:
   means for controlling the temperature in said combustion chamber, in at least a volume comprising the position of insertion of said first fluid into said chamber, to be in said optimal operating temperature range, wherein:
   said supplier is at least a first axially displaceable tube for displaceable insertion into said combustion chamber; and
   a said device comprises means for ejecting an additional fluid into said combustion chamber through said tube under pressure so as to disturb the flow of the flue gas in the combustion chamber to create swirls, change the flow pattern and improve the mixing in said combustion chamber.

31. The device according to claim 30, wherein said additional fluid is air or re-circulated flue gas.

32. A device for reducing the emission of at least one substance from a combustion or gasification plant by means of supplying a first fluid for optimising flue gas or gas parameters, said first fluid being effective to reduce the emission of said at least one substance and having a optimal operating temperature range, said plant comprising a combustion or gasification chamber having a supplier for supplying at least said first fluid to said chamber, comprising:
   means for controlling the temperature in said combustion chamber, in at least a volume comprising the position of insertion of said first fluid into said chamber, to be in said optimal operating temperature range,
   wherein said device further comprises means for ejecting another fluid into said combustion chamber, said fluid being effective to raise the temperature in said volume in said combustion chamber if said temperature is below said optimal operating range.

33. The device according to claim 32, wherein said another fluid is ejected through said supplier, and said third fluid is selected from a group of fuels of hydrocarbons including gaseous fuels, liquid fuels, and solid fuels.

34. A device for reducing the emission of at least one substance from a combustion or gasification plant by means of supplying a first fluid for optimising flue gas or gas parameters, said first fluid being effective to reduce the emission of said at least one substance and having a optimal operating temperature range, said plant comprising a combustion or gasification chamber having a supplier for supplying at least said first fluid to said chamber, comprising:
   means for controlling the temperature in said combustion chamber, in at least a volume comprising the position of insertion of said first fluid into said chamber, to be in said optimal operating temperature range,
   wherein a second fluid is ejected into said combustion chamber if the temperature measured by said thermocouple is above said optimal operating temperature range and wherein said third fluid is ejected into said combustion chamber if the temperature measured by said thermocouple is below said optimal operating temperature range.

\* \* \* \* \*